US009506946B2

(12) United States Patent
Ocak et al.

(10) Patent No.: US 9,506,946 B2
(45) Date of Patent: Nov. 29, 2016

(54) FULLY DIFFERENTIAL CAPACITIVE ARCHITECTURE FOR MEMS ACCELEROMETER

(71) Applicants: PGS Geophysical AS, Oslo (NO); **Agency for Science Technology and Research (A*STAR)**, Connexis (SG)

(72) Inventors: Ilker Ender Ocak, Singapore (SG); Chengliang Sun, Singapore (SG); Julius Ming-Lin Tsai, San Jose, CA (US); Sanchitha Nirodha Fernando, Singapore (SG)

(73) Assignees: PGS Geophysical AS, Oslo (NO); **Agency for Science Technology and Research (A*STAR)**, Connexis (SG)

( * ) Notice: Subject to any disclaimer, the term of this patent is extended or adjusted under 35 U.S.C. 154(b) by 155 days.

(21) Appl. No.: 14/294,999

(22) Filed: Jun. 3, 2014

(65) Prior Publication Data
US 2015/0293142 A1    Oct. 15, 2015

Related U.S. Application Data

(63) Continuation of application No. 14/190,673, filed on Feb. 26, 2014.

(60) Provisional application No. 61/785,851, filed on Mar. 14, 2013, provisional application No. 61/786,259, filed on Mar. 14, 2013.

(51) Int. Cl.
*G01P 3/00* (2006.01)
*G01P 15/125* (2006.01)
(Continued)

(52) U.S. Cl.
CPC ........... *G01P 15/125* (2013.01); *G01P 15/131* (2013.01); *G01V 1/02* (2013.01); *G01V 1/38* (2013.01); *G01P 2015/0837* (2013.01); *G01P 2015/0882* (2013.01)

(58) Field of Classification Search
CPC .... G01P 3/487; G01P 1/026; H01L 2924/00; H01L 2224/48227; G01D 5/145
USPC ........................................................ 73/514.39
See application file for complete search history.

(56) References Cited

U.S. PATENT DOCUMENTS

| 2,443,471 A | 6/1948 | Mason |
| 4,104,920 A | 8/1978 | Albert et al. |

(Continued)

FOREIGN PATENT DOCUMENTS

| WO | 90/15997 | 12/1990 |
| WO | 2008/088644 | 7/2008 |

OTHER PUBLICATIONS

Jim Karki, "Fully differential amplifiers," Analog and Mixed-Signal Products, Analog Applications Journal Aug. 2000, pp. 38-42.
(Continued)

*Primary Examiner* — Eric S McCall
*Assistant Examiner* — Mohammed E Keramet-Amircolai
(74) *Attorney, Agent, or Firm* — Meyertons, Hood, Kivlin, Kowert & Goetzel, P.C.

(57) ABSTRACT

A fully differential microelectromechanical system (MEMS) accelerometer configured to measure Z-axis acceleration is disclosed. This may avoid some of the disadvantages in traditional capacitive sensing architectures—for example, less sensitivity, low noise suppression, and low SNR, due to Brownian noise. In one embodiment, the accelerometer comprises three silicon wafers, fabricated with electrodes forming capacitors in a fully differential capacitive architecture. These electrodes may be isolated on a layer of silicon dioxide. In some embodiments, the accelerometer also includes silicon dioxide layers, piezoelectric structures, getter layers, bonding pads, bonding spacers, and force feedback electrodes, which may apply a force to the proof mass region. Fully differential MEMS accelerometers may be used in geophysical surveys, e.g., for seismic sensing or acoustic positioning.

22 Claims, 8 Drawing Sheets

(51) Int. Cl.
*G01P 15/13* (2006.01)
*G01V 1/02* (2006.01)
*G01V 1/38* (2006.01)
*G01P 15/08* (2006.01)

(56) References Cited

U.S. PATENT DOCUMENTS

| | | | |
|---|---|---|---|
| 4,175,723 A * | 11/1979 | Shea, Jr. | B64G 1/12 244/121 |
| 4,565,940 A | 1/1986 | Hubbard, Jr. | |
| 4,849,668 A | 7/1989 | Crawley et al. | |
| 4,932,261 A | 6/1990 | Henrion | |
| 5,095,750 A | 3/1992 | Suzuki et al. | |
| 5,205,171 A | 4/1993 | O'Brien et al. | |
| 5,396,798 A | 3/1995 | Frische | |
| 5,440,939 A | 8/1995 | Barny et al. | |
| 5,504,032 A | 4/1996 | Gessner et al. | |
| 5,952,572 A | 9/1999 | Yamashita et al. | |
| RE36,498 E | 1/2000 | Howe et al. | |
| 6,040,625 A | 3/2000 | Ip | |
| 6,196,067 B1 | 3/2001 | Martin et al. | |
| 6,504,385 B2 | 1/2003 | Hartwell et al. | |
| 6,805,008 B2 | 10/2004 | Selvakumar et al. | |
| 7,134,338 B2 | 11/2006 | Gahn et al. | |
| 7,258,011 B2 | 8/2007 | Nasiri et al. | |
| 7,610,809 B2 | 11/2009 | McNeil et al. | |
| 7,974,152 B2 | 7/2011 | Tenghamn | |
| 8,331,198 B2 | 12/2012 | Morozov et al. | |
| 8,427,901 B2 | 4/2013 | Lunde et al. | |
| 8,441,892 B2 | 5/2013 | Morozov et al. | |
| 8,446,798 B2 | 5/2013 | Tenghamn | |
| 8,534,276 B2 | 9/2013 | Palumbo et al. | |
| 8,590,376 B2 | 11/2013 | Reinert et al. | |
| 8,618,718 B2 | 12/2013 | Qu et al. | |
| 8,634,276 B2 | 1/2014 | Morozov et al. | |
| 2003/0006783 A1* | 1/2003 | Min | G01R 27/2605 324/676 |
| 2004/0073373 A1* | 4/2004 | Wilson | G01V 1/3835 702/16 |
| 2005/0109108 A1* | 5/2005 | Chen | G01P 15/18 73/514.16 |
| 2006/0137450 A1* | 6/2006 | Eskridge | G01P 15/0802 73/514.16 |
| 2007/0022811 A1 | 2/2007 | Becka | |
| 2008/0253225 A1 | 10/2008 | Welker et al. | |
| 2009/0234302 A1* | 9/2009 | Hoendervoogt | A61M 5/14276 604/288.01 |
| 2009/0241662 A1 | 10/2009 | Supino et al. | |
| 2010/0103772 A1* | 4/2010 | Eick | G01V 1/3808 367/21 |
| 2011/0132088 A1* | 6/2011 | Jenkins | G01P 15/0802 73/514.29 |
| 2011/0211423 A1* | 9/2011 | Muyzert | G01V 7/00 367/21 |
| 2011/0296918 A1 | 12/2011 | Yao et al. | |
| 2012/0002504 A1* | 1/2012 | Muyzert | G01V 7/00 367/21 |
| 2013/0039149 A1 | 2/2013 | Tenghamn et al. | |
| 2013/0044565 A1 | 2/2013 | Barr et al. | |
| 2014/0260617 A1 | 9/2014 | Ocak et al. | |
| 2014/0260618 A1 | 9/2014 | Ocak et al. | |
| 2015/0293142 A1 | 10/2015 | Ocak et al. | |

OTHER PUBLICATIONS

Fully differential amplifier, Wikipedia, the free encyclopedia, http://en.wikipedia.org/wiki/Fully_differential_amplifier, 4 pages [Retrieved Mar. 5, 2013].

Matan Nurick and Radai Rosenblat, "Design of a Fully Differential Capacitive Sensing Circuit for MEMS Accelerometers," Capacitive Sensing Project, VLSI Laboratory, Technion, Israel, May 2004, 6 pages.

Ma Li Ya, et al., "Novel MEMS fully differential capacitive transducer design and analysis," International Conference on Mechatronics (ICOM), May 17-19, 2011, 4 pages.

Yi-Chang Hsu, et al., "Implementation of fully-differential capacitance sensing accelerometer using glass proof-mass with Si-vias," IEE 24th International conference on Micro Electro Mechanical Systems (MEMS), Jan. 23-27, 2011, pp. 589-592.

Joseph I. Seeger, et al., "Sense Finger Dynamics in a SD Force-Feedback Gyroscope," Berkeley Sensor & Actuator Center & Department of Electronics and Computer Science, Southampton University, 4 pages.

Xiaofeng Zhou, et al., "A novel sandwich capacitive accelerometer with a symmetrical structure fabricated from a D-SOI wafer," IOP Publishing Journal of Micromechanics and Microengineering, 22, 2012, 9 pages.

Qing-Ming Wang, et al., "Analysis of thin film piezoelectric microaccelerometer using analytical and finite element modeling," Elsevier: Sensors and Actuators A 113, 2004, pp. 1-11.

Zhaochun Yang and Qing-Ming Wang, "Transient response of piezoelectric thin-film vibration sensor under pulse excitation," Journal of Applied Physics 99, 014107, 2006, pp. 1-5.

Chengliang Sun, et al., "Piezoelectric Energy Harvesting using Single Crystal Pb(Mg1/3Nb2/3)O3-xPbTiO3 (PMN-PT) Device," Journal of Intelligent Material Systems and Structures, vol. 00, published on Nov. 28, 2008, pp. 1-10.

John A. Judge, et al., "Attachment loss of micromechanical and nanomechanical resonators in the limits of thick and thin support structures," Journal of Applied Physics 101, 013521, 2007, pp. 1-11.

Amy Duwel, et al., "Quality Factors of MEMS Gyros and The Role of Thermoelastic Damping," the Fifteenth IEEE International Conference on Micro Electro Mechanical Systems, Jan. 24-24, 2002, pp. 214-219.

Wen-Teng Chang, et al., "Energy Dissipation in Folded-Beam MEMS Resonators Made from Single Crystal and Polycrystalline 3C-SiC Films," Proceedings of the 2nd IEEE International Conference on Nano/Micro Engineered and Molecular Systems, Jan. 16-19, 2007, pp. 740-744.

Xiong Wang, et al., "Support Loss and Q Factor Enhancement for a Rocking Mass Microgyroscope," Sensors 11, ISSN 1424-8220, 2011, pp. 9807-9819.

F.R. Blom, et al., "Dependence of the quality factor of micromachined silicon beam resonators on pressure and geometry," MESA-Research Institute, J. Vac. Sci. Technol. B vol. 10 No. 1, Jan./Feb. 1992, pp. 19-26.

Minhang Bao, et al., "Energy transfer model for squeeze-film air damping in low vacuum," IOP Publishing Journal of Micromechanics and Microengineering, 12, 2002, pp. 341-346.

Timo Veijola, "Compact models for squeezed-film dampers with inertial and rarefied gas effects," IOP Publishing Journal of Micromechanics and Microengineering, 14, 2004, pp. 1109-1118.

Hartono Sumali, "Squeeze-film damping in the free molecular regime: model validation and measurement on a MEMS," IOP Publishing Journal of Micromechanics and Microengineering, 17, 2007, pp. 2231-2240.

Vladimir P. Petkov, et al., "High-Order Electromechanical Sigma-Delta Modulation in Micromachined Inertial Sensors," IEEE Transactions on Circuits and Systems, I: Regular Papers, vol. 53, No. 5, May 2006, pp. 1016-1022.

Johan Raman, et al., "An Unconstrained Architecture for Systematic Design of Higher Order Sigma-Delta Force-Feedback Loops," IEEE Transactions on Circuits and Systems—I: Regular Papers, vol. 55, No. 6, Jul. 2008, pp. 1601-1614.

Haluk Külah, et al., "Noise Analysis and Characterization of a Sigma-Delta Capacitive Microaccelerometer," IEEE Journal of Solid-State Circuits, vol. 41, No. 2, Feb. 2006, pp. 352-361.

Ilker E. Ocak, et al., "A high performance Sigma-Delta readout circuitry for ug resolution microaccelerometers," Analog Integr Circ Sig Process, 2010, pp. 137-145.

Yong Zhou, "Layout Synthesis of Accelerometers," Master of Science Project Report, Department of Electrical and Computer Engineering, Carnegie Mellon University, Aug. 1998, 52 pages.

(56) References Cited

OTHER PUBLICATIONS

European Search Report in Application No. 14158906.9 mailed Jun. 30, 2014, 6 pages.
European Search Report in Application No. 14158907.7 mailed Jun. 30, 2014, 6 pages.
Office Action in U.S. Appl. No. 14/190,673 mailed Feb. 5, 2016, 15 pages.
Office Action in U.S. Appl. No. 14/190,721 mailed Feb. 5, 2016, 16 pages.
Office Action in U.S. Appl. No. 14/190,721 mailed Jun. 28, 2016, 14 pages.
Office Action in U.S. Appl. No. 14/295,080 mailed May 23, 2016, 19 pages.
Office Action in U.S. Appl. No. 14/190,673 mailed Jun. 27, 2016, 17 pages.

* cited by examiner

FULLY DIFFERENTIAL CAPACITIVE ARCHITECTURE FOR MEMS ACCELEROMETER

CROSS-REFERENCE TO RELATED APPLICATIONS

This application is a continuation of U.S. application Ser. No. 14/190,673, filed Feb. 26, 2014, which claims priority to U.S. Provisional Application Nos. 61/785,851, filed Mar. 14, 2013, and 61/786,259, filed Mar. 14, 2013. All of the above applications are incorporated by reference herein in their entireties.

BACKGROUND

Microelectromechanical system (MEMS) accelerometers are widely used in many different application areas such as geophysical surveying, underwater imaging, navigation, medical, automotive, aerospace, military, tremor sensing, consumer electronics, etc. These sensors typically detect acceleration by measuring the change in position of a proof mass, for example, by a change in the associated capacitance. Traditional capacitive MEMS accelerometers may have poor performance due to low noise suppression and sensitivity, however.

Measurement noise and range may vary for different applications of sensors. For example, for a navigation application, a measurement range of ±20 g may be desired and 1 µg/√Hz measurement noise for this range could be tolerated. As another example, a tremor sensing application may desire a ±1 g measurement range and a lower noise floor of ~10-100 ng/√Hz. The main type of noise affecting this noise floor is Brownian noise. Brownian noise refers to noise produced by Brownian motion. Brownian motion refers the random movement of particles suspended in a liquid or gas resulting from their bombardment by the fast-moving atoms or molecules in the liquid or gas.

Accelerometers may have many uses in the field of geophysical surveying, particularly marine seismic. For example, in some marine seismic embodiments, a survey vessel may tow one or more streamers in a body of water. Seismic sources may be actuated to cause seismic energy to travel through the water and into the seafloor. The seismic energy may reflect off of the various undersea strata and be detected via sensors on the streamers, and the locations of geophysical formations (e.g., hydrocarbons) may be inferred from these reflections.

These streamer sensors that are configured to receive the seismic energy may include accelerometers such as those described in this disclosure. (Various other sensors may also be included in some embodiments, such as pressure sensors, electromagnetic sensors, etc.)

Additionally, accelerometers may be used to detect the relative positions of the streamers (or portions thereof) via acoustic ranging. Acoustic ranging devices typically may include an ultrasonic transmitter and electronic circuitry configured to cause the transceiver to emit pulses of acoustic energy. The travel time of the acoustic energy between a transmitter and receivers (e.g., accelerometers) disposed at a selected positions on the streamers is related to the distance between the transmitter and the receivers (as well as the acoustic velocity of the water), and so the distances may be inferred.

In other marine seismic embodiments, accelerometers according to this disclosure may also be used in permanent reservoir monitoring (PRM) applications, for example at a seafloor. Generally, the term "geophysical survey apparatus" may refer to streamers, PRM equipment, and/or sensors that form portions of streamers or PRM equipment.

Accordingly, improvements in accelerometer technology (e.g., allowing better performance and/or lower cost) may provide substantial benefits in the geophysical surveying field, among other fields.

This specification includes references to "one embodiment" or "an embodiment." The appearances of the phrases "in one embodiment" or "in an embodiment" do not necessarily refer to the same embodiment. Particular features, structures, or characteristics may be combined in any suitable manner consistent with this disclosure.

Various units, circuits, or other components may be described or claimed as "configured to" perform a task or tasks. In such contexts, "configured to" is used to connote structure by indicating that the units/circuits/components include structure (e.g., circuitry) that performs the task or tasks during operation. As such, the unit/circuit/component can be said to be configured to perform the task even when the specified unit/circuit/component is not currently operational (e.g., is not on). The units/circuits/components used with the "configured to" language include hardware—for example, circuits, memory storing program instructions executable to implement the operation, etc. Reciting that a unit/circuit/component is "configured to" perform one or more tasks is expressly intended not to invoke 35 U.S.C. §112, sixth paragraph, for that unit/circuit/component.

DETAILED DESCRIPTION

Figure 1:
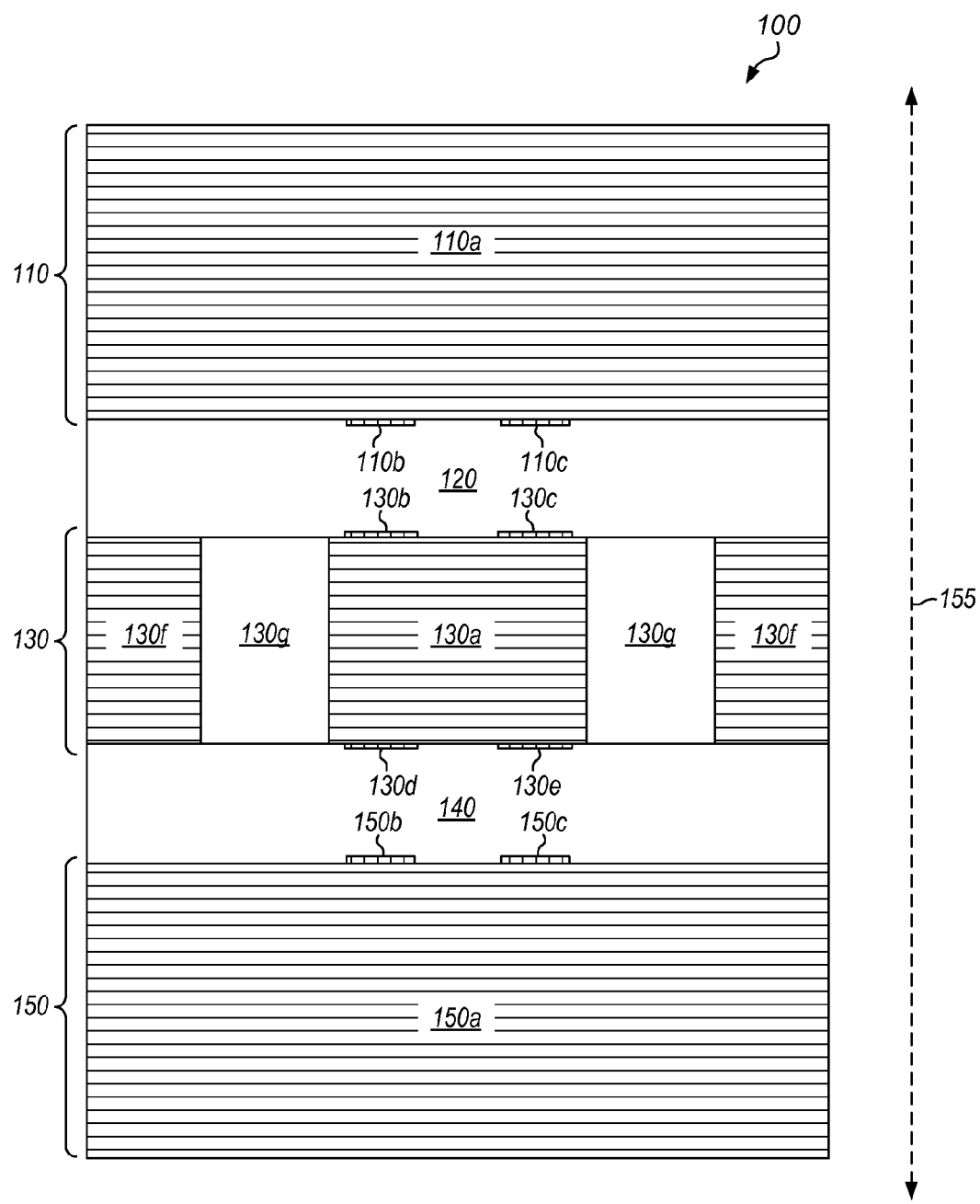
FIG. 1 is a block diagram illustrating one embodiment of a device.

Turning now to FIG. 1, a block diagram illustrating one embodiment of a device 100 is shown. Device 100 includes upper substrate 110, interior substrate 130, and lower substrate 150. In various embodiments, substrates 110, 130, and 150 contain wafers 110a, 130a and 130f (regions of the wafer on substrate 130), and 150a respectively. In various embodiments, these wafers may be silicon wafers. As used herein, the term "wafer" is used broadly to refer to any material used for fabricating microelectromechanical system (MEMS) devices. As will be recognized by one skilled in the art with the benefit of this disclosure, "depositing" material on a substrate may occur according to various methods common in the MEMS device field. In some embodiments, this deposition method is performed as described below with reference to FIGS. 3 and 4. As depicted, interior substrate 130 is split into three portions, proof mass 130a and anchor regions 130f. In the illustrated embodiment, these portions are separated by cavities 130g. Proof mass 130a may also be referred to as a proof mass region. Cavities 130g may be etched by various methods recognized by one skilled in the art, including one described below with reference to FIG. 5.

In the embodiment shown, upper substrate 110 is bonded to interior substrate 130, and lower substrate 150 is bonded to interior substrate 130. Bonding may occur using any suitable method known in the art. In one embodiment, bonding between substrates 110 and 130 and between 150 and 130 occurs using precision gap control, which is described briefly with reference to FIG. 4. In one embodiment, cavity 120 between upper substrate 110 and interior substrate 130 and cavity 140 between lower substrate 150 and interior substrate 130 are vacuum-sealed. Cavities 130g may also be vacuum-sealed. In some embodiments, cavities 120 and 140 may be vacuum-sealed in part by bonding substrates 110, 130, and 150 together in a vacuum environment. Substrate 130 may have portions etched away such that vacuum-sealed cavities 130g, cavity 120, and cavity 140 may be in fluid communication with each other (e.g., they may possess a common vacuum).

In one embodiment, substrates 110, 130, and 150 are divided into two parts: the wafers of each substrate (110a, 130a and 130f together, and 150a respectively), and a set of electrodes (110b & 110c, 130b & 130c, 130d & 130e, and 150b & 150c). Two sets of electrodes may be deposited/situated/disposed on interior substrate 130: the first on the upper surface, forming electrodes 130b and 130c; and the second on the lower surface, forming electrodes 130d and 130e. Said differently, the sets of electrodes on the interior substrate are deposited on the top and bottom of the interior substrate, or on opposite sides of the interior substrate. (Note that the phrase "opposite sides" of a structure such as a substrate is not limited to the top and bottom of a structure; instead, the phrase may be used to variously refer to the left and right sides of a structure, or the front and back sides of a structure. Of course, the characterization of different portions of a structure as top, bottom, left, right, front, and back depends on a particular vantage point.)

In one embodiment, a set of electrodes is deposited on the lower surface of upper substrate 110, forming electrodes 110b and 110c. A set of electrodes is also deposited on the upper surface of lower substrate 150, forming electrodes 150b and 150c. Both of these sets of electrodes on upper substrate 110 and lower substrate 150 may be referred to as a set of electrodes deposited, situated, or disposed on an opposing surface (i.e., the respective upper and lower surfaces of interior substrate 130). In some embodiments, sets of electrodes (110b and 110c, 130b and 130c, 130d and 130e, and 150b and 150c) may be deposited as a metallic layer.

As used herein, "opposing" surfaces are those that face each other. As used herein, the term "deposited" refers to any fabrication technique in which a type of material is placed on at least a portion of an underlying material or layer. The term "layer" is to be construed according to its ordinary usage in the art, and may refer to a material that covers an entire portion of one or more underlying materials, as well as discrete regions situated on top of the underlying material(s). Accordingly, a "layer" may be used to refer to the set of electrodes depicted in FIG. 1, which may result from a continuous deposition of material that is deposited and then partially etched away. In some embodiments—for example as described below with reference to FIG. 4—a certain layer may fall "below" another layer that was deposited first because the first deposited layer is not continuous. For example, a deposition of a piezoelectric material may be processed such that the layer contains discrete portions. Accordingly, when another spring layer is deposited, some portions of the spring layer may fall "below" the piezoelectric layer since it is not continuous. Thus, portions of the spring layer may appear to be at the same vertical level as the piezoelectric layer. Accordingly, in some instances, the term "layer" refers to the order of deposition, and not necessarily the vertical position (e.g., height) of materials in reference to one another.

In the embodiment shown, the set of electrodes on the upper substrate 110 and the set of electrodes on the upper substrate of the upper surface of interior substrate 130 are configured to form two capacitors. Electrodes 110b and 130b are configured to form one capacitor; electrodes 110c and 130c, the other capacitor. Similarly, the set of electrodes on lower substrate 150 and the set of electrodes on the lower surface of interior substrate 130 are configured to form two capacitors. Electrodes 150b and 130d are configured to form one capacitor; electrodes 150c and 130e, the other. Overall, by forming these four capacitors, device 100 is configured to perform in a fully differential capacitive architecture, and device 100 may be referred to as a fully differential capacitive MEMS accelerometer. The fully differential capacitive architecture allows the differences (e.g., voltage, current, or capacitance) to be measured by another circuit. In some embodiments, a fully differential capacitive architecture may allow the capacitors to be connected using a full bridge connection or a Wheatstone bridge connection. In another embodiment, the fully differential capacitive architecture may be connected to differential readout circuitry, for example, using a differential operational amplifier. In some embodiments, these configurations may avoid the disadvantages of a low signal-to-noise ratio found in traditional MEMS accelerometers.

In addition, the architecture shown in FIG. 1 allows measurement of acceleration along an axis 155 that perpendicularly intersects substrates 110, 130, and 150 (referred to as the "Z-axis" herein). Because proof mass 130a is separated from anchor regions 130f by cavities 130g, anchor regions 130f act as an anchor/stabilizer when proof mass 130a moves upwards and downwards along Z-axis 155. This movement leads to slight variations in the position of proof mass 130a, which leads to slight changes in the capacitance of the capacitors arranged in the fully differential architecture. This change in capacitance allows the capacitors to detect a change in the position of proof mass 130a. The fully differential capacitive architecture shown in FIG. 1 thus allows a Z-axis acceleration to be measured.

In another embodiment, device 100 may contain additional electrodes or capacitors situated surrounding interior substrate 130. With additional structural modifications, known to one skilled in the art, these additional electrodes or capacitors allow measurement of the acceleration of proof mass 130a as it moves side-to-side (i.e., to the left or right of interior substrate 130) or front-to-back (i.e., into and out of sheet 1). In such an embodiment, device also includes lateral accelerometer capabilities. Accordingly, in one embodiment, device 100 may measure acceleration along Z-axis 155, as well as in an X-Y plane perpendicular to Z-axis 155 (i.e., a plane parallel to substrate 130). This allows an acceleration to be measured or detected in three dimensions.

In one embodiment, the capacitors formed by substrates 110, 130, and 150 detect the movement of proof mass 130a by using a system configured to detect changes in the capacitances. Because sets of electrodes deposited on the substrates are used for sensing the acceleration in device 100, these electrodes may be referred to as sensing electrodes. The system detecting the changes in the capacitances may be any system that is configured to use the capacitances—for example, a closed-loop readout circuit. In other embodiments, along with vacuum packaging and piezoelectric damping, this capacitive architecture may be used in closed-loop accelerometer systems, as well as any other resonating MEMS structure. Together, the four capacitors form a fully differential architecture. In one instance, as proof mass 130a is displaced along the Z-axis by an applied acceleration, two of the capacitors are increasing in capacitance, while the other two are decreasing equally. The differences in capacitances in each capacitor, as measured by any system configured to use capacitances, indicate the position of proof mass 130a. In certain embodiments, with proper full bridge connection of these four capacitors, the architecture of device 100 may avoid some of the disadvantages in traditional capacitive sensing architectures—for example, less sensitivity, low noise suppression, and low SNR. These disadvantages may arise in part from Brownian noise.

The Brownian noise that may be associated with a sensor such as a MEMS accelerometer may be represented by the following equation:

$$\text{Noise}_{MEMS} = \sqrt{4k_B Tb/M}$$

In this equation, $k_B$ is Boltzmann's constant ($1.381 \times 10^{-23}$ J/K), T represents the ambient temperature in K, b represents the damping coefficient in N/(m/s), and M represents the mass of the resonating structure. As can be seen by this equation, thermal noise of the system can be decreased by increasing the mass and decreasing the air damping of the system. By designing a huge mass for the accelerometer, thermal noise can be decreased down to the order of hundreds of ng/√Hz levels, but practically, MEMS devices are not designed with large sensor dimensions.

A high vacuum level may be used to decrease the Brownian noise by reducing the quantity of random interactions of air molecules with the sensor. Accordingly, the use of a vacuum may in some embodiments reduce the noise floor of the system to ng/√Hz levels. Thus in some embodiments, the use of a vacuum-sealed cavity, for example 120, 130g, and 140, may reduce the Brownian noise inside device 100. In one embodiment, vacuum-sealed cavities 120, 130g, and 140 are used to reduce Brownian noise—specifically, the Brownian noise inside device 100.

But the use of a vacuum may, in some embodiments, increase the quality factor of the system greatly, even over 10,000 levels, which may contribute to instabilities. To counteract the high vacuum level needed, piezoelectric damping may be used. Piezoelectric damping transforms the kinetic oscillation energy of an accelerometer to electrical energy that may be dissipated outside the system, for example, by connecting the piezoelectric structures to a tunable external load. Thus the quality factor may decrease to manageable levels.

Besides the effects of Brownian noise on measurement noise and measurement range, non-linearities may affect the performance of MEMS devices. As one skilled in the art with the benefit of this disclosure will recognize, non-linearity of a MEMS device may be affected by frequency response, sensing architecture, springs or the readout circuit. These mechanically-related non-linearities may be reduced by using a closed-loop readout circuit, which may stabilize a proof mass within a MEMS accelerometer to its original position. In certain embodiments, a closed-loop readout circuit comprises the fully differential capacitors, or sensing capacitors, and force feedback electrodes. (Force feedback electrodes are discussed more fully below with reference to FIG. 4D). With these elements connected in a closed-loop, the accelerometer may adjust the position of the proof mass to maintain linear operation, using the acceleration detected by the capacitors and a force applied by the force feedback electrodes. Thus, using a closed-loop circuit architecture with a MEMS accelerometer may avoid some of the disadvantages of non-linearities.

Figure 2:
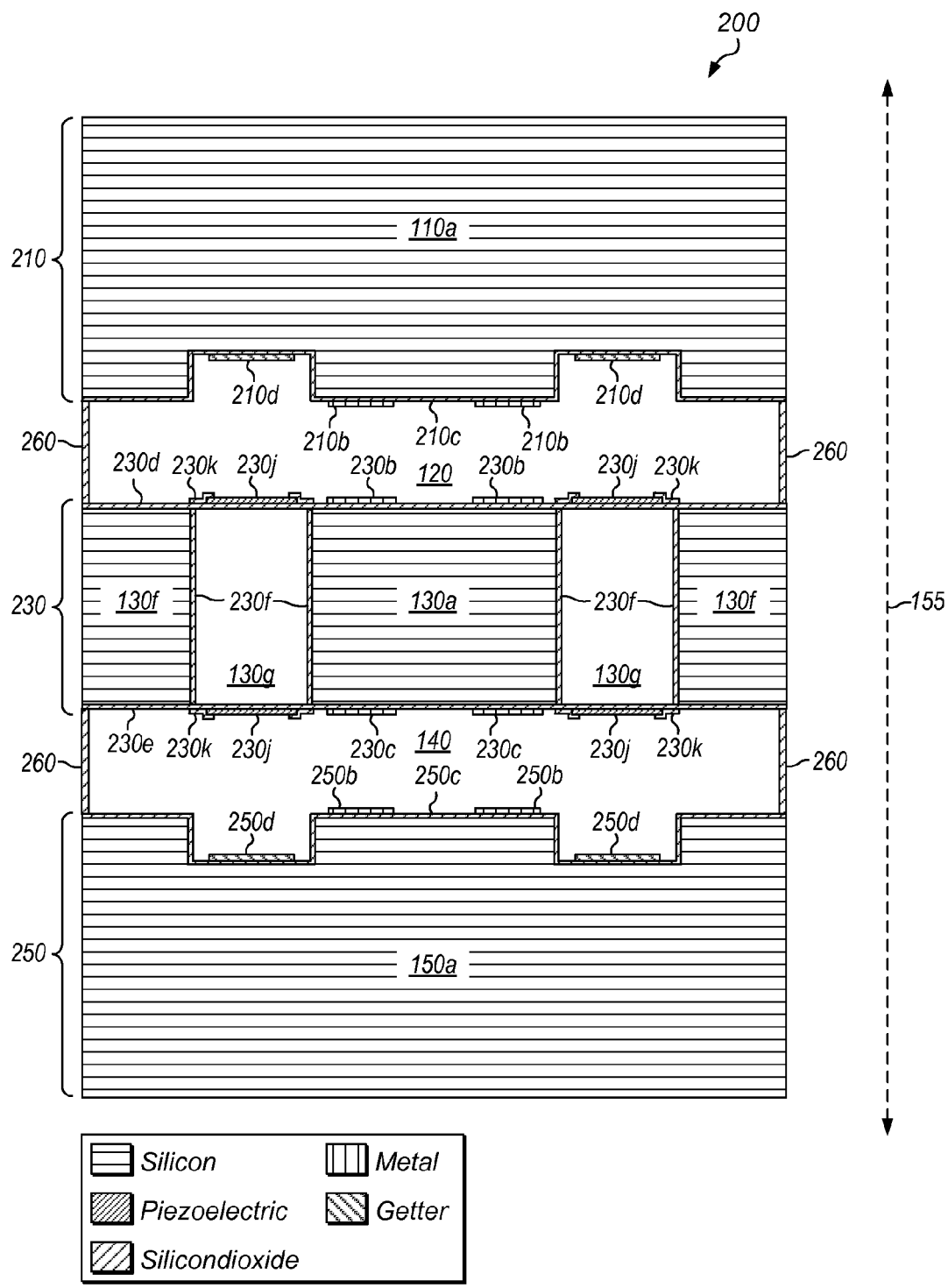
FIG. 2 is a block diagram illustrating one embodiment of a MEMS accelerometer.

Turning now to FIG. 2, a block diagram illustrating one embodiment of a MEMS accelerometer 200 is shown. As depicted, accelerometer 200 includes upper substrate 210, interior substrate 230, and lower substrate 250. In various embodiments, substrates 210, 230, and 250 contain wafers 110a, 130a and 130f (regions of the wafer on substrate 230), and 150a respectively, all of which are similarly numbered to FIG. 1, and may be configured as described above with reference to FIG. 1. Additionally, in the embodiment shown, the wafer of interior substrate 230 is split into three portions, proof mass 130a and anchor regions 130f. In the illustrated embodiment, these portions are separated by cavities 130g and bounded by protection structures 230f. In one embodiment, protection structures 230f may be silicon dioxide. In this embodiment, cavity 120 between upper substrate 210 and interior substrate 230, cavity 140 between lower substrate 250 and interior substrate 230, and cavities 130 g are vacuum-sealed. By vacuum-sealing, or vacuum-packaging, these cavities, certain embodiments of accelerometer 200 may avoid some of the disadvantages of Brownian noise discussed above.

Interior substrates 230 may include several parts: the silicon wafer, composed of proof mass 130 and anchor regions 130f; cavities 130g, bounded in part by protection structures 230f; sets of electrodes 230b and 230c; spring layers 230d and 230e; piezoelectric structures 230j; and pairs of electrodes 230k situated on piezoelectric structures 230j. In one embodiment, substrates 210 and 250 are divided into four parts: the wafers of each substrate, 110a and 150a respectively; sets of electrodes 210b and 250b respectively; oxide layers, 210c and 250c respectively; and getter layers 210d and 250d.

In the embodiment shown, upper substrate 210 is bonded to interior substrate 230, and lower substrate 250 is bonded to interior substrate 230 as well. In one embodiment of FIG. 1, bonding between substrates 210 and 230 and between 250 and 230 occurs using a precision gap control technique. As depicted, substrates 210, 230, and 250 are bonded to each other using bonding structures 260. Bonding structures 260 may be composed of any material known to one skilled in the art that may suitably vacuum seal cavities 120, 130g, and 140. In one embodiment, bonding structures 260 may be composed of silicon dioxide; in another, a metallic material or composition such as copper and tin. In other embodiments, bonding structures 260 may be composed of metallic compositions such as gold and tin, or aluminum and germanium. Alternately, bonding structures 260 may be composed of both silicon dioxide and metallic contacts. Cavities 120 and 140 may be vacuum-sealed in part by bonding structures 260. Substrates 210, 230, and 250 may also assist in vacuum-sealing cavities 120 and 140. In some embodiments, cavities 120 and 140 may be vacuum-sealed in part by bonding substrates 210, 230, and 250 together. Spring layers 230d and 230e may have portions etched away such that vacuum-sealed cavities 120, 130g, and 140 may be in fluid communication with each other (e.g., they may possess a common vacuum). Thus, the vacuum-sealed cavity, comprising cavities 120, 130g, and 140, may be bounded in part by upper substrate 210, lower substrate 250, and protection structures 230f. Bonding structures 260 and substrate 230 may also bound in part the common vacuum throughout cavities 120, 130g, and 140. Vacuum-sealed cavities 120, 130g, and 140 may assist in avoiding noise (e.g., Brownian noise) caused by the movement of proof mass 130a.

In one embodiment, spring layers 230d and 230e are grown/deposited on opposing surfaces of interior substrate 230. As used herein, the term "grown" refers to any fabrication technique in which a type of material is placed on at least a portion of an underlying material or layer by heating that material or layer to high temperatures. For example, heating a silicon substrate to high temperatures may create bonds with oxygen atoms in the air so that silicon dioxide is formed. Thus another material or layer may be grown by this thermal oxide growth. Spring layers 230d and 230e may be composed of an oxide such as silicon dioxide. Spring layers 230d and 230e allow proof mass 130a to vary in position within interior substrate 230, with anchor regions 130f assisting by adding stability to interior substrate 230. Oxide layers 210c and 250c are grown, or disposed, on the lower surface of upper substrate 210 and the upper surface of lower substrate 250 respectively. Oxide layers 210c and 250c may be composed of silicon dioxide. Getter layers 210d and 250d, which assist in maintaining the common vacuum of vacuum-sealed cavities 120, 130g, and 140, are deposited on oxide layers 210c and 250c. In some embodiments, getter layers 210d and 250d may be deposited on any portion of substrates 210, 230, and 250 exposed to the vacuum-sealed cavity. In one embodiment, a single getter layer may exist within accelerometer 200, deposited on some portion of substrates 210, 230, and/or 250. Getter layers 210d may be composed of any suitable material known to those skilled in the art, and may assist, in some embodiments, in avoiding some of the disadvantages of Brownian noise within vacuum-sealed cavities 120, 130g, and 140.

As shown, two sets of electrodes 230b and 230c may be deposited on spring layers 230d and 230e—the first on the upper surface of interior substrate 230; and the second, on the lower surface. Said differently, sets of electrodes 230b and 230c may be deposited on opposite sides of the interior substrate. A set of electrodes 210b is deposited on the lower surface of upper substrate 210. A set of electrodes 250b is also deposited on the upper surface of lower substrate 250. Both sets of electrodes 210b and 250b on upper substrate 210 and lower substrate 250 respectively may be referred to as a set of electrodes deposited on an opposing surface from the upper and lower surface respectively of interior substrate 230.

In the embodiment shown, sets of electrodes 210b and 230b are configured to form two capacitors. Similarly, sets of electrodes 230c and 250b are configured to form two capacitors. Overall, by forming these four capacitors, accelerometer 200 is configured to perform in a fully differential capacitive architecture, for example, as described above with reference to FIG. 1. Accordingly, in the embodiment depicted in FIG. 2, the fully differential capacitive architecture may allow the capacitors to operate together to detect changes in an acceleration of proof mass 130a as it moves upwards and downwards along Z-axis 155. For example, the capacitors formed by sets of electrodes 210b, 230b, 230c, and 250b may detect a change in the acceleration of accelerometer 200. Then, a closed-loop circuit or system may determine an acceleration of accelerometer using the measured electrical current, change in capacitance, or change in voltage of these capacitors. In some embodiments, this closed-loop circuit or system may be referred to as front-end readout circuitry, which may use a differential operational amplifier configuration. In some embodiments, accelerometer 200 may contain additional electrodes or capacitors situated surrounding interior substrate 230. With additional structural modifications known to one skilled in the art these additional electrodes or capacitors allow measurement of acceleration in an X-Y plane perpendicular to Z-axis 155. Such modifications would allow acceleration to be measured or detected in three dimensions.

In one embodiment, accelerometer 200 also includes piezoelectric structures 230j disposed on spring layers 230d and 230e. Piezoelectric structures 230j may be composed of any piezoelectric material. Piezoelectric structures 230j translate mechanical energy from spring layers 230d and 230e into electrical energy, which may be measured by pairs of electrodes 230k disposed on each piezoelectric structure 230j. Further, this electrical energy may be dissipated externally to decrease the overall energy of the system. The piezoelectric material may bend due to the movement of proof mass 130a, which is translated to mechanical energy by spring layers 230d and 230e. The addition of this piezoelectric damping, together in operation with sets of electrodes 210b, 230b, 230c, and 250b forming a fully differential capacitive architecture, may reduce the Q-factor of accelerometer 200 in a closed-loop system. The Q-factor may be adjusted by various readout circuitries based on the measurements from piezoelectric structures 230j.

Figure 3A:
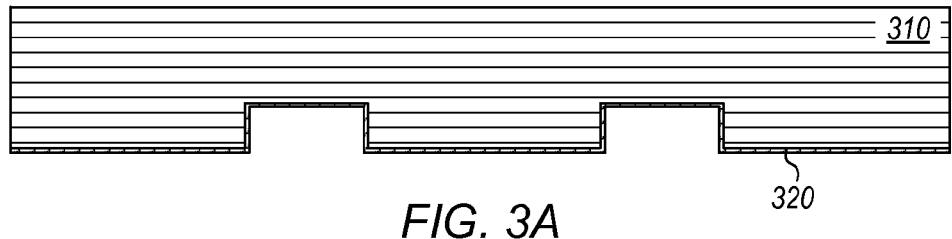
FIGS. 3A-C illustrate an exemplary process flow for the fabrication of a cap substrate.
Figure 3B:
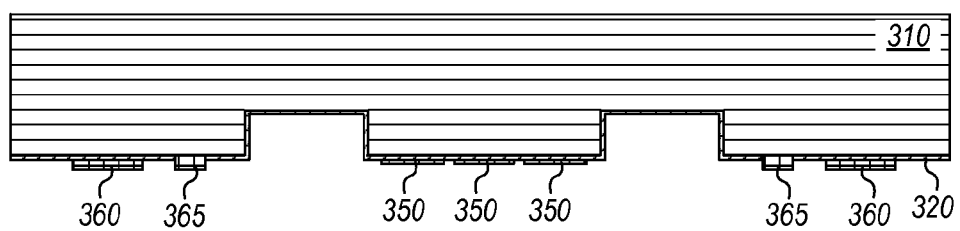
Figure 3C:
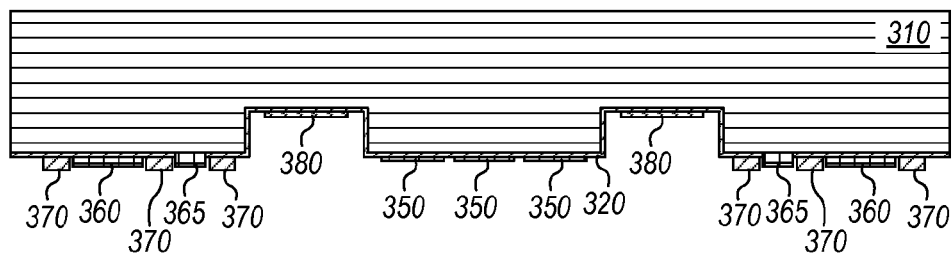

FIGS. 3A-C illustrate an exemplary process flow for the fabrication of a cap substrate. Turning now to FIG. 3A, substrate 310 may be a silicon wafer, etched for the later deposition of getter layers. Layer 320 is deposited or grown on substrate 310. Layer 320 may be further patterned. In one embodiment, layer 320 may be silicon dioxide. Turning now to FIG. 3B, a set of electrodes 350 and metallic contacts 360 and 365 are deposited on layer 320. Notably, the set of electrodes 350 are isolated from one another on layer 320. Set of electrodes 350 may be any type of metallic contact. Metallic contacts 360 and 365 may be chromium, which may be patterned with lift off. In this embodiment, layer 320 is patterned further for the deposition of metallic contacts 365. In other embodiments, metallic contacts 360 and 365 may be deposited on another layer, which may be silicon dioxide, especially patterned for their deposition. This additional layer may be deposited partially on layer 320, for example, deposited only in the regions of metallic contacts 360 and 365.

Turning now to FIG. 3C, spacers 370 are deposited on layer 320. In some embodiments, spacers 370 may also be deposited on another layer, which may be silicon dioxide, especially patterned for their deposition. As depicted, spacers 370 may be silicon dioxide. In some embodiments, metallic contacts 360 and 365 and spacers 370 may operate as a bonding region to be bonded to another substrate as described below with reference to FIG. 4. In one embodiment, spacers 370 may be referred to as bonding spacers.

Figure 4A:
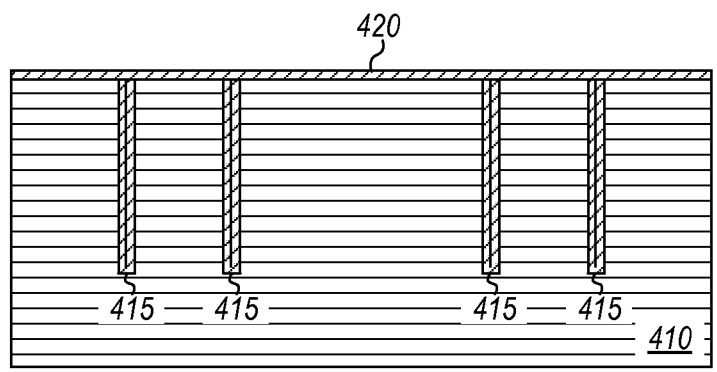
FIGS. 4A-F illustrate an exemplary process flow for the fabrication of a fully differential MEMS accelerometer.
Figure 4B:
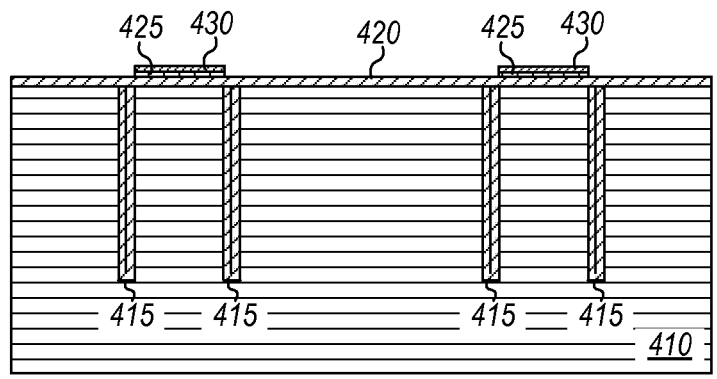
Figure 4C:
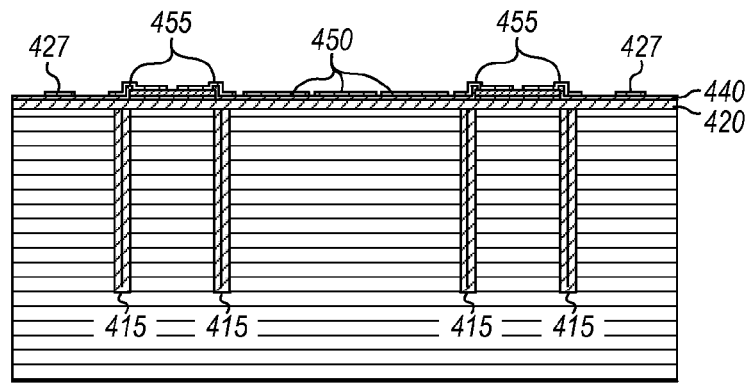
Figure 4D:
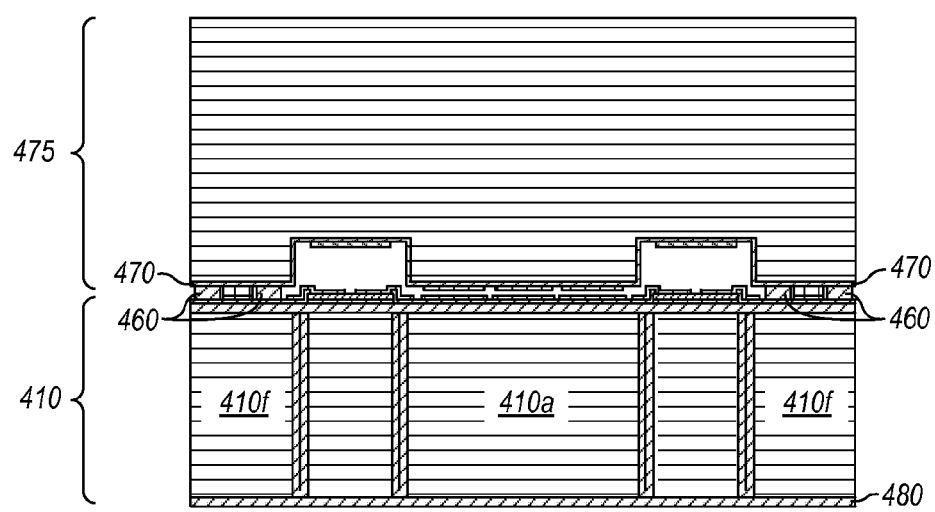

FIGS. 4A-F illustrate an exemplary process flow for the fabrication of a fully differential MEMS accelerometer. Turning now to FIG. 4A, substrate 410 may be a silicon wafer. Trenches 415 may be filled with silicon dioxide. In one specific embodiment, trenches 415 may be 3 µm wide. To fill trenches 415, trenches 415 may be etched first by any method known to one skilled in the art. For example, in one embodiment, using deep reactive-ion etching (DRIE), 3 µm wide trenches are opened on the silicon wafer. Then, to fill trenches 415, oxide is grown on the surface of substrate 410. In another embodiment, this oxide may be used as a masking layer for etching in later fabrication stages, for example, XeF$_2$ (gaseous) etching to remove portions of substrate 410. The depth of trenches 415 may affect the thickness of the accelerometer mass because substrate 410 is part of the fully fabricated accelerometer. Referring briefly to FIG. 4D, because trenches 415 isolate proof mass 410a from anchor regions 410f, trenches 415 may be referred to as isolation trenches. Trenches 415 also protect proof mass 410a and anchor regions 410f from possible later etching steps. Thus trenches 415 may also be referred to as protection trenches. Layer 420 is deposited/grown on substrate 410, also covering trenches 415. Layer 420 may be silicon dioxide. In one embodiment, layer 420 may also be patterned for deposition of subsequent layers or deposited portions. In this accelerometer embodiment, layer 420 may be referred to as a "spring layer." In one specific embodiment, the thickness of layer 420 may be 4 µm.

Turning now to FIG. 4B, metallic contacts 425 are deposited and patterned for deposition of piezoelectric structures 430 (also referred to as piezoelectric layers). Metallic contacts 425 (also referred to as bottom electrodes) may be various metals, known to one skilled in the art. Piezoelectric structures 430 may be various piezoelectric materials, known to one skilled in the art. To form piezoelectric structures 430, piezoelectric material is deposited. In certain embodiments, both metallic contact 425 and piezoelectric structure 430 may be referred to as the piezoelectric structure.

Turning now to FIG. 4C, layer 440 is deposited/grown on layer 420 and patterned to protect the side walls of piezoelectric structures 430. Layer 440 (also referred to as sidewall protection) may be silicon dioxide. Then, top metallization is deposited on layer 440. This metallic deposition forms set of electrodes 450 (also referred to as contact electrodes). Set of electrodes 450 are deposited so that the electrodes are isolated from each other on layer 440. In one embodiment with a further etching step, set of electrodes 450 may also be patterned. Layer 440 may also include another thin layer of silicon dioxide. That layer may be patterned so that the bonding regions, the regions extending laterally outwards from piezoelectric structures 430 (or the region surrounding and including bonding pads 427) are defined for the later bonding of spacers 460, which are depicted in FIG. 4D. These bonding regions may also be referred to as wafer bonding areas. Bonding pads 427 are deposited in the same metallic deposition as sets of electrodes 450. In one embodiment, bonding pads 427 may also be patterned, for example, especially for later bonding of a cap wafer. Finally, in the same metallic deposition, pairs of electrodes 455 are deposited on piezoelectric structures 430 and partially on layer 440. In the wafer bonding areas, set of electrodes 450, and pairs of electrodes 455, chromium may be patterned with lift off. In another embodiment, bonding pads 427, sets of electrodes 450, and pairs of electrodes 455 may be deposited and patterned in separate steps. For example, these elements may be deposited or electroplated. In some embodiments, the metals used for bonding pads 427, sets of electrodes 450, and pairs of electrodes 455 may be gold, aluminum, or chromium.

Turning now to FIG. 4D, cap wafer 475 is bonded to substrate 410 by any bonding process known to one skilled in the art. As part of substrate 410, proof mass 410a is bounded in part by trenches 415 and spring layers 420 and 480. In one embodiment, cap wafer 475 may be bonded to substrate 410 by any suitable method to known to one skilled in the art. For example, various bonding methods may be used to align spacers 460 with the bonding region on substrate 410 and bonding pads 427 with an opposing contact on cap wafer 475 between bonding spacers 460. This may also assist in determining spacing between substrate 410 and cap wafer 475. In some embodiments, for example in accelerometer 200 as described above with reference to FIG. 2, such a bonding method may determine the height of cavities 120 and 140. Because of this bonding process, in one embodiment, spacers 460 may be referred to as bonding spacers. In some embodiments, cap wafer 475 may be a cap wafer fabricated by the process illustrated in FIG. 3. Thus cap wafer 475 contains layer 470, which may be silicon dioxide, isolating the set of electrodes on cap wafer 475 opposing set of electrodes 450.

During this bonding process, set of electrodes 450 are aligned to oppose the set of electrodes on cap wafer 475 so that at least a portion of these sets of electrodes may form the capacitors to be used in a fully differential capacitive architecture. In some embodiments, various bonding methods known to one skilled in the art may assist in determining the spacing of set of electrodes 450 from the set of electrodes on cap wafer 475. In certain embodiments, the center electrode of set of electrodes 450 and the opposing electrode on cap wafer 475 may form electrode contacts to be used for force feedback. That is, these electrodes are operable to apply a force to proof mass 410a.

MEMS accelerometers, to operate in a regime of approximate linearity, may use electrodes to apply a force to the proof mass. In the embodiment depicted in FIG. 4D, the center electrode of set of electrodes 450 and the opposing electrode on cap wafer 475 may form electrode contacts to be used for force feedback. In some embodiments, this may avoid some of the disadvantages of MEMS accelerometers that use electrodes for sensing and force feedback at the same time. Certain MEMS accelerometers must switch between integration and feedback in a closed loop circuit, which may increase circuit complexity and may decrease the maximum average feedback force applied. But to operate in a closed loop circuit, accelerometers may need to apply force to the proof mass or structure. Thus in the embodiment shown, separate electrodes (namely, the center electrode of set of electrodes 450 and the opposing electrode on cap wafer 475) are used to apply force to the proof mass. Because these electrodes are used solely to apply force, these electrodes may be referred to as force feedback electrodes. These electrodes receive feedback from an external circuit to apply a force to proof mass region, which may allow accelerometer 400 to avoid operating in a non-linear manner. Such force feedback electrodes may also allow accelerometer 400 to avoid switching complexity from an external circuit and may increase the measurement range of accelerometer 400.

After cap wafer 475 is bonded to substrate 410, substrate 410 is ground from bottom up to the tip of trenches 415. In some embodiments, substrate 410 may be ground somewhat beyond the tips of trenches 415. Then layer 480 is grown/deposited on the bottom (or may be referred to as backside) of substrate 410. In one specific embodiment, the thickness of layer 480 may be 4 µm. In this accelerometer embodiment, layer 480 is referred to as a spring layer.

Figure 4E:
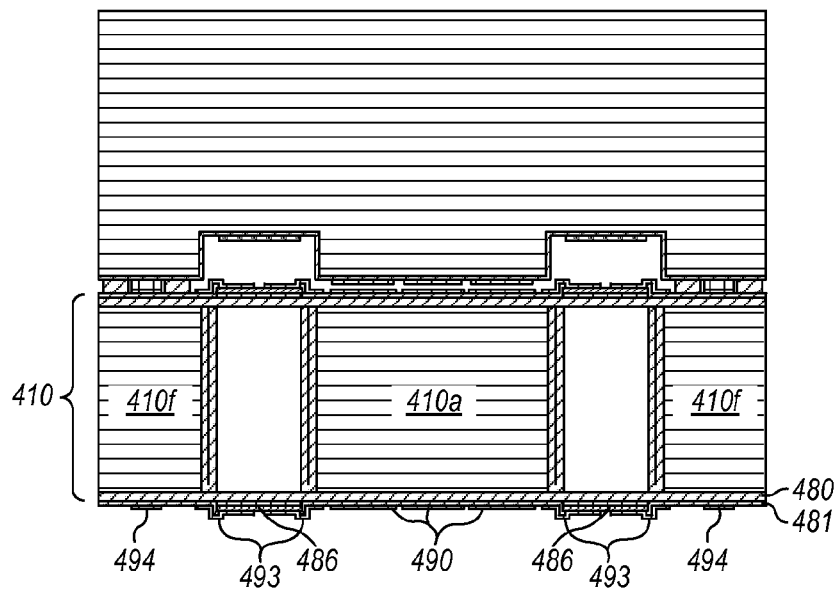

Turning now to FIG. 4E, layer 481 (also referred to as sidewall protection), piezoelectric structures 486 (also referred to as piezoelectric layers) including metallic contacts/bottom electrodes, set of electrodes 490, pairs of electrodes 493 (also referred to as contact electrodes), and bonding pads 494 are deposited on to layer 480 using the same or similar process outlined above with reference to FIGS. 4A-C, with similar corresponding elements. Substrate 410 may be etched to form cavities between trenches 415 as described below with reference to FIG. 5. After etching, proof mass 410a is separated from anchor regions 410f by trenches 415 and the cavities bounded in part by trenches 415.

Figure 4F:
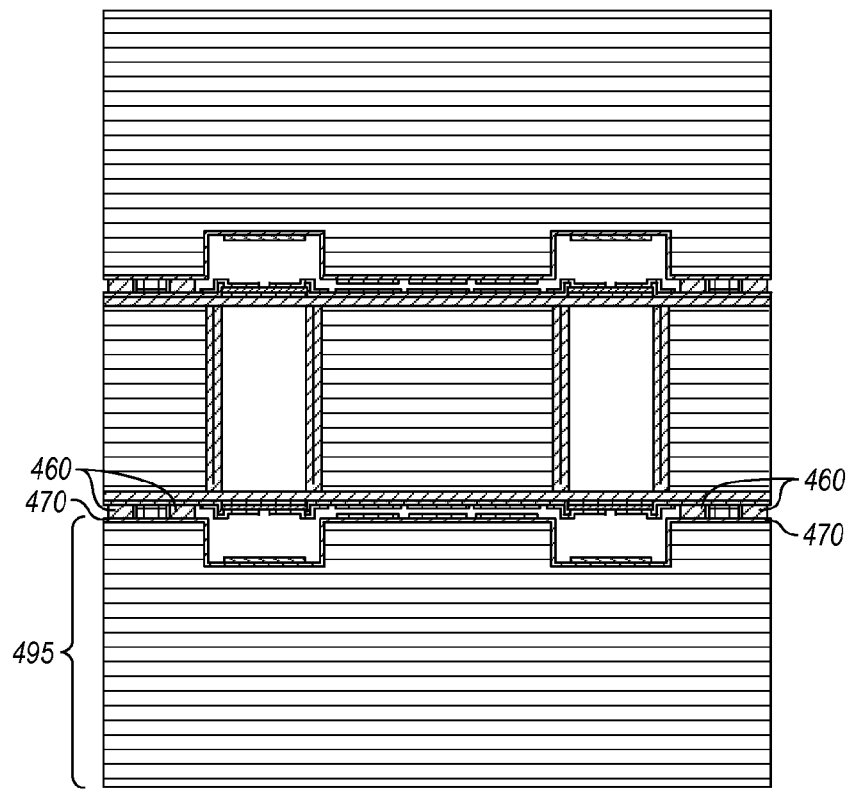

Turning now to FIG. 4F, cap wafer 495 is bonded to substrate 410 using the same or similar process described above with reference to FIG. 4D. Various bonding methods known to one skilled in the art may align spacers 460 with the bonding region on substrate 410 and align bonding pads with an opposing contact on cap wafer 495 between bonding spacers 460. Such bonding methods may assist in determining spacing between substrate 410 and cap wafer 495. In some embodiments, cap wafer 495 may be a cap wafer fabricated by the same or similar process illustrated in FIG. 3. Thus cap wafer 495 contains layer 470, which may be silicon dioxide, isolating the set of electrodes on cap wafer 495 opposing the corresponding set of electrodes on substrate 410, at least a portion of these sets of electrodes may form the capacitors to be used in a fully differential capacitive architecture. Thus substrate 410 and cap wafers 475 and 495 are now fabricated to form a fully differential MEMS accelerometer. In certain embodiments, the bottom center electrode of substrate 410 and center electrode on cap wafer 495 may form electrode contacts to be used for force feedback. In some embodiments, for example in accelerometer 200, this last bonding step may form a common vacuum-sealed cavity throughout cavities 120, 130g, and 140.

Figure 5A:
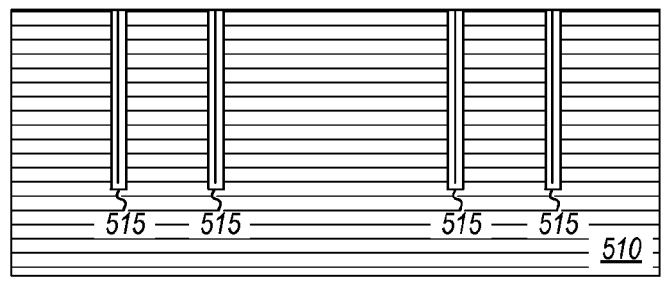
FIGS. 5A-E illustrate an exemplary process flow for the etching of cavities within a substrate.

FIGS. 5A-E illustrate an exemplary process flow for the etching of cavities within a substrate. Turning now to FIG. 5A, substrate 510 may be a silicon wafer. Trenches 515 may be etched by any method known to one skilled in the art. For example, in one embodiment, using deep reactive-ion etching (DRIE), 3 μm wide trenches are opened on the silicon wafer. Trenches 515 may be used as protection layers, or protection structures, during the later isotropic release processes. The depth of trenches 515 may affect the thickness of the accelerometer mass. In an accelerometer implementation, for example in accelerometer 200, trenches 515 may be referred to as protection trenches.

Figure 5B:
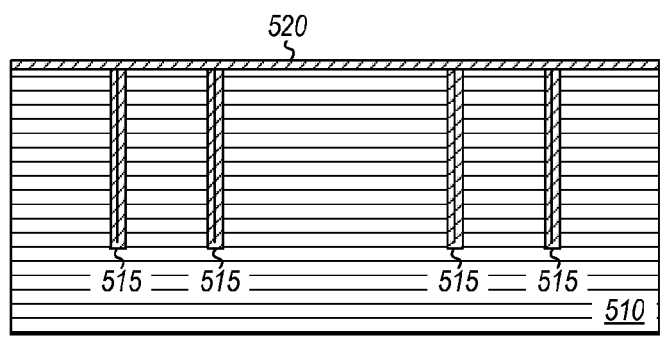

Turning now to FIG. 5B, trenches 515 are grown/filled/deposited, with an oxide, for example silicon dioxide conformally. This filling process grows a layer of oxide on the surface of 510, which is removed with CMP. Then layer 520 is grown/deposited on substrate 510. The thickness of layer 520, which may be silicon dioxide, may affect the thickness of the spring layers used in an accelerometer implementation. For example, layer 520 may be spring layer 230d on substrate 230 in accelerometer 200. Thus, in some embodiments, precise thickness control of layer 520 may be used during deposition.

Figure 5C:
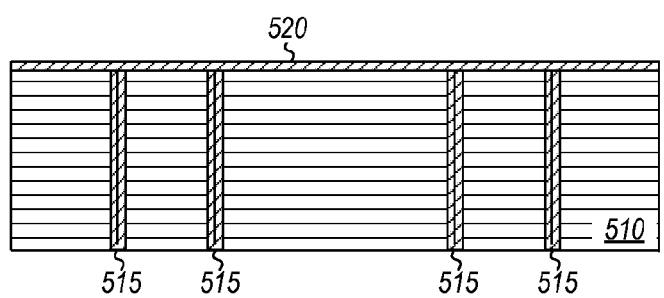
Figure 5D:
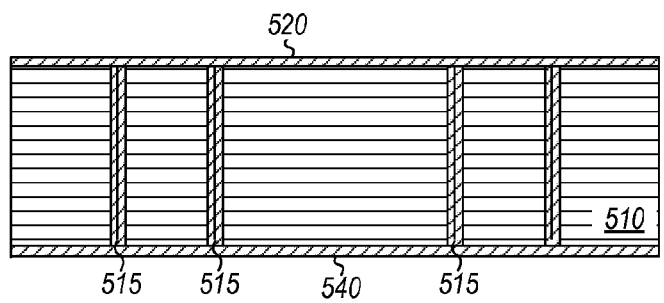

Turning now to FIG. 5C, a bottom portion of substrate 510 is removed, for example through grinding and (chemical mechanical polishing) CMP. The removal may be up to the bottom of trenches 515. Then, turning now to FIG. 5D, layer 540 is grown/deposited on substrate 510. The thickness of layer 540, which may be silicon dioxide, may affect the thickness of a spring layer used in an accelerometer implementation. For example, layer 520 may be spring layer 230e on substrate 230 in accelerometer 200. Thus, in some embodiments, precise thickness control of layer 540 may be used during deposition. Layers 520 and 540 may be surface patterned for use as spring layers in an accelerometer embodiment.

Figure 5E:
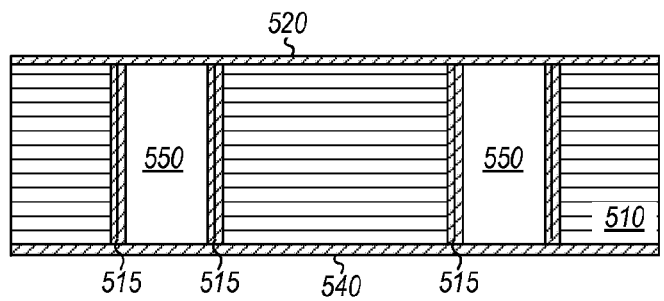

Turning now to FIG. 5E, using both photo resist and silicon dioxide as mask layer, bulk silicon regions between trenches 515 are etched through substrate 510. In some embodiments, this etching process may be performed using dry vertical etching techniques, known to one skilled in the art. In some embodiments, the etching may be omitted; it may be advantageous to conduct the etching, however, in order to decrease the processing time of the subsequent processing step. After these trenches are etched bonded wafers are placed into $XeF_2$ (gaseous) for isotropic release of substrate 510. Silicon dioxide covering all surfaces (i.e., through layers 520 and 540 and filled trenches 515) of substrate 510 act as a masking layer. Substrate 510 is etched as shown in FIG. 5E, leaving cavities 550. By vacuum-sealing, or vacuum-packaging, cavities 550, implemented in an accelerometer, may avoid some of the disadvantages of Brownian noise discussed above.

Overall, FIGS. 5A-E depict one embodiment of a method comprising: etching at least two trenches in a substrate; depositing a first support layer on the upper surface of the substrate; depositing a second support layer on the lower surface of the substrate; etching the substrate bounded by the trenches and the first and second support layers. The method may further comprise, wherein etching the trenches in the substrate includes: filling the trenches with a support material; removing a portion of the support material; and removing a portion of the lower surface of the substrate. The method may further comprise, wherein depositing the first and second support layer further includes: patterning the first and second support layers. The method may further comprise, wherein the etching the substrate further includes: etching the interior of the substrate to form at least one vacuum-sealed cavity bounded by the trenches and the first and second support layers.

Figure 6:
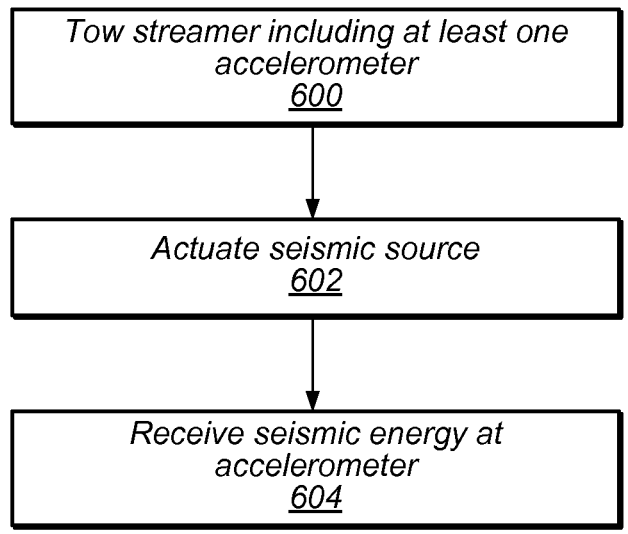
FIGS. 6-7 illustrate methods for the use of accelerometers in a geophysical survey according to this disclosure.

Turning now to FIG. 6, a method in accordance with one embodiment of this disclosure is provided. Flow begins at step 600.

At step 600, a survey vessel tows a streamer including at least one accelerometer in accordance with this disclosure. In various embodiments, the streamer may include a plurality of accelerometers in accordance with this disclosure, and it may also include other sensors (e.g., pressure sensors and/or electromagnetic sensors). In some instances, the survey vessel may tow a plurality of such streamers. Flow proceeds to step 602.

At step 602, one or more seismic sources are actuated. These may be located on the survey vessel, towed by the survey vessel, towed by a different vessel, etc. Seismic energy from the seismic sources travels through the water and into the seafloor. The seismic energy then reflects off of the various geophysical formations. Various portions of the seismic energy may then be reflected upward toward the streamer, in some instances incorporating time delays and/or phase shifts that may be indicative of the geophysical formations. Flow proceeds to step 604.

At step 604, seismic energy is received at the accelerometers located on the streamers. Different portions of the seismic energy may reach the accelerometers either directly from the seismic sources, or after one or more reflections at the seafloor and/or water surface. Data based on the received seismic energy may then be used to infer information about geological structures that may exist under the seafloor. Flow ends at step 604.

Figure 7:
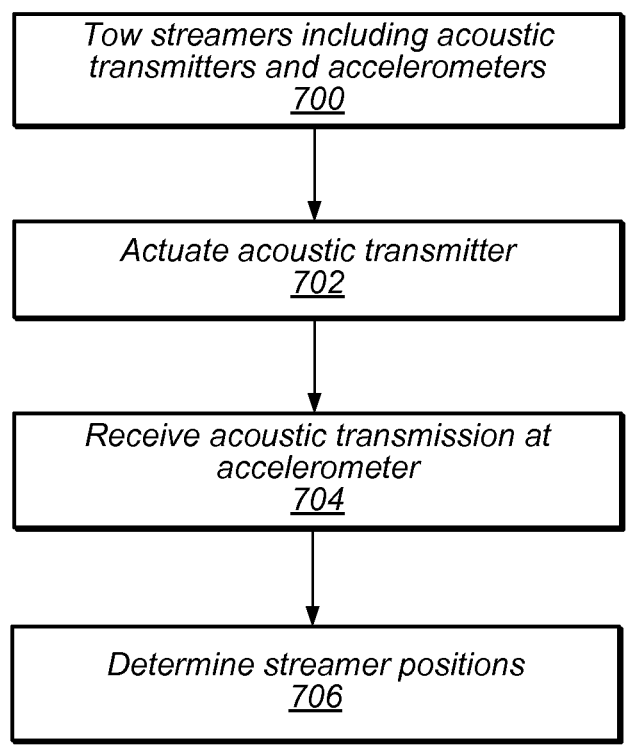

Turning now to FIG. 7, an additional method in accordance with one embodiment of this disclosure is provided. Flow begins at step 700.

At step 700, a survey vessel tows streamers including acoustic transmitters, and also including accelerometers in accordance with this disclosure. In some instances, the acoustic transmitters and the accelerometers may be combined into an acoustic transceiver. Flow proceeds to step 702.

At step 702, one or more of the acoustic transmitters are actuated. The acoustic energy produced by the transmitters may travel through the water toward the other streamers. Flow proceeds to step 704.

At step 704, the acoustic energy is received by an accelerometer. The delay between the actuation of the acoustic transmitters and the reception at the accelerometer may be based in part on the distance between them. Flow proceeds to step 706.

At step 706, the positions of the streamers (or portions thereof) are determined. For example, such positions may be determined based on the distances between pairs of acoustic transmitters and accelerometers. Flow ends at step 706.

One of ordinary skill in the art with the benefit of this disclosure will understand that various aspects of this disclosure may in some embodiments be implemented via computer systems. Such computer systems may in some embodiments include various types of non-transitory computer-readable media, such as hard disks, CDs, DVDs, RAM, ROM, tape drives, floppy drives, etc.

Although specific embodiments have been described above, these embodiments are not intended to limit the scope of the present disclosure, even where only a single embodiment is described with respect to a particular feature. Examples of features provided in the disclosure are intended to be illustrative rather than restrictive unless stated otherwise. The above description is intended to cover such alternatives, modifications, and equivalents as would be apparent to a person skilled in the art having the benefit of this disclosure.

The scope of the present disclosure includes any feature or combination of features disclosed herein (either explicitly or implicitly), or any generalization thereof, whether or not it mitigates any or all of the problems addressed herein. Accordingly, new claims may be formulated during prosecution of this application (or an application claiming priority thereto) to any such combination of features. In particular, with reference to the appended claims, features from dependent claims may be combined with those of the independent claims and features from respective independent claims may be combined in any appropriate manner and not merely in the specific combinations enumerated in the appended claims.

Numerous variations and modifications will become apparent to those skilled in the art once the above disclosure is fully appreciated. It is intended that the following claims be interpreted to embrace all such variations and modifications.

What is claimed is:

1. A method, comprising:
    towing a streamer behind a survey vessel in a body of water, wherein the streamer includes an accelerometer;
    detecting, by at least four capacitors within the accelerometer, a change in acceleration of the accelerometer, wherein:
        the four capacitors include a first capacitor and a second capacitor on a first side of a proof mass and a third capacitor and a fourth capacitor on a second side of the proof mass, and each of the four capacitors includes a respective pair of electrodes; and
        in response to the proof mass moving in a selected direction, a capacitance of the first and second capacitors is operable to increase, and a capacitance of the third and fourth capacitors is operable to decrease; and
    determining an acceleration of the accelerometer based at least in part on the detecting.

2. The method of claim 1, wherein detecting the change in acceleration includes measuring an electrical current across the at least four capacitors.

3. The method of claim 2, wherein measuring the electrical current includes:
    measuring a change in capacitance of the at least four capacitors; and
    measuring a change in voltage of the at least four capacitors.

4. The method of claim 1, wherein determining the acceleration includes determining the Z-axis acceleration.

5. The method of claim 1, wherein determining the acceleration includes using front-end readout circuitry connected to the at least four capacitors.

6. The method of claim 1, further comprising:
    actuating a seismic energy source to produce seismic energy, wherein the acceleration of the accelerometer is based at least in part on the seismic energy.

7. The method of claim 1, further comprising:
    towing another streamer behind the survey vessel in the body of water; and
    actuating an acoustic transmitter on the another streamer to produce acoustic energy, wherein the acceleration of the accelerometer is based at least in part on the acoustic energy.

8. A sensor configured to receive seismic energy, the sensor comprising:
    an accelerometer that includes:
    a first substrate including a proof mass;
    first and second spring layers respectively disposed on a first surface and a second, opposite surface of the first substrate;
    first and second sets of at least two electrodes respectively disposed on the first and second spring layers;
    a second substrate spaced from the first spring layer, wherein a third set of at least two electrodes are disposed on the second substrate at locations corresponding to those of the first set of electrodes; and
    a third substrate spaced from the second spring layer, wherein a fourth set of at least two electrodes are disposed on the third substrate at locations corresponding to those of the second set of electrodes.

9. The sensor of claim 8, wherein the first and third sets of electrodes and the second and fourth sets of electrodes respectively form capacitors operable to detect variations in the proof mass.

10. The sensor of claim 8, wherein electrodes in the first, second, third, and fourth sets of electrodes are operable at least in part to apply a force to the proof mass.

11. The sensor of claim 8,
    wherein the second substrate is spaced from the first spring layer by a vacuum-sealed cavity,
    wherein the third substrate is spaced from the second spring layer by the vacuum-sealed cavity.

12. The sensor of claim 11,
    wherein the vacuum-sealed cavity is bounded in part by bonding structures including metallic and silicon dioxide portions.

13. The sensor of claim 8, wherein each electrode in the first and second set of electrodes includes:
    an oxide portion disposed on the first spring layer; and
    a metal contact disposed on the oxide portion.

14. The sensor of claim 13, wherein the first substrate further includes first and second sets of piezoelectric structures respectively disposed on the first and second spring layers, wherein each piezoelectric structure in the first and second sets of piezoelectric structures includes:

a metallic portion disposed on the first spring layer;
a piezoelectric contact disposed on the metallic portion;
first and second oxide portions respectively disposed on opposite sides of the piezoelectric contact; and
a pair of electrodes disposed on the first and second oxide portions.

15. A sensor configured to receive seismic energy, the sensor comprising:
an accelerometer that includes:
a central substrate region;
a first bonded substrate opposing a first surface of the central substrate region;
a second bonded substrate opposing a second surface of the central substrate region;
a first pair of capacitors formed between the first bonded substrate and the central substrate region; and
a second pair of capacitors formed between the second bonded substrate and the central substrate region, wherein each of the first pair and second pair of capacitors includes a respective pair of electrodes, and wherein in response to an acceleration in a selected direction, a capacitance of the first pair of capacitors is operable to increase, and a capacitance of the second pair of capacitors is operable to decrease.

16. The sensor of claim 15, wherein the central substrate region includes:
a proof mass region bounded by a first spring structure, a second spring structure, a first protection structure, and a second protection structure.

17. The sensor of claim 16, further comprising:
a vacuum-sealed cavity bounded in part by the first and second bonded substrates, the first and second protection structures, a third protection structure, and a fourth protection structure.

18. The sensor of claim 17, wherein the first, second, third, and fourth protection structures are disposed laterally on either side of the proof mass region, and wherein the first and second bonded substrates are disposed vertically on either side of the central substrate region.

19. The sensor of claim 17, wherein the first, second, third, and fourth protection structure include silicon dioxide.

20. The sensor of claim 15, wherein the first bonded substrate includes a first getter layer, wherein the second bonded substrate includes a second getter layer.

21. A sensor configured to receive seismic energy, the sensor comprising:
an accelerometer that is a fully differential MEMS accelerometer configured to measure Z-axis acceleration of a proof mass, wherein the accelerometer includes:
a proof mass;
a first capacitor and a second capacitor on a first side of the proof mass; and
a third capacitor and a fourth capacitor on a second side of the proof mass;
wherein each of the four capacitors includes a respective pair of electrodes; and
wherein in response to the proof mass moving in a selected direction, a capacitance of the first and second capacitors is operable to increase, and a capacitance of the third and fourth capacitors is operable to decrease.

22. The sensor of claim 21, wherein the sensor includes a central substrate region including the proof mass, two anchor regions, and two portions of a vacuum-sealed cavity.

* * * * *